United States Patent [19]

Thole et al.

[11] Patent Number: 5,217,188
[45] Date of Patent: Jun. 8, 1993

[54] MODULAR SOLID-PROPELLANT LAUNCH VEHICLE AND RELATED LAUNCH FACILITY

[75] Inventors: John M. Thole; Michael S. Kelly, both of Redlands, Calif.

[73] Assignee: TRW Inc., Redondo Beach, Calif.

[21] Appl. No.: 681,825

[22] Filed: Apr. 8, 1991

[51] Int. Cl.⁵ .............................................. B64G 1/40
[52] U.S. Cl. ................................ 244/172; 244/158 R; 244/63
[58] Field of Search ................... 244/158 R, 63, 160, 244/162, 172; 89/1.8, 1.804, 1.805, 1.806, 1.81, 1.816, 1.819

[56] References Cited

U.S. PATENT DOCUMENTS

| | | | |
|---|---|---|---|
| 3,202,381 | 8/1965 | Wuenscher | 244/1 |
| 3,267,809 | 8/1966 | Sikora | 244/63 |
| 3,284,888 | 11/1966 | McClain et al. | 89/1.805 |
| 3,286,629 | 11/1966 | Laue | 244/172 |
| 3,369,771 | 2/1968 | Walley et al. | 244/162 |
| 3,702,688 | 11/1972 | Faget | 244/162 |
| 4,344,592 | 8/1982 | Constaninescu | 244/63 |
| 4,451,017 | 5/1984 | Marshall | 244/172 |
| 4,604,938 | 8/1986 | Kennedy et al. | 89/1.8 |
| 4,625,619 | 12/1986 | Ceniza | 244/63 |
| 4,671,163 | 6/1987 | Erikson | 89/1.81 |
| 4,834,324 | 5/1989 | Criswell | 244/160 |
| 4,932,607 | 6/1990 | Layton et al. | 244/63 |

FOREIGN PATENT DOCUMENTS 0335677 10/1989 European Pat. Off. ............ 244/172
9013481 11/1990 European Pat. Off. ............ 244/160

OTHER PUBLICATIONS

Clarke Newlon, Boeing Starts Work on ICBM Minuteman, Oct. 27, 1958, p. 20.
Aviation Week from Westinghouse . . . equipment for hardened missile bases, May 18, 1959, pp. 142 and 143.
Stafford, L. et al., "Zenith Star Launch System," Aerospace America, Sep. 1990, pp. 40–43.

Primary Examiner—Joseph F. Peters, Jr.
Assistant Examiner—Anne E. Bidwell
Attorney, Agent, or Firm—James M. Steinberger; Sol L. Goldstein

[57] ABSTRACT

A family of modular solid-propellant launch vehicles and a related launch facility for placing a wide range of payloads in earth orbit at greatly reduced costs compared to present day launch systems. The basic family of modular solid-propellant launch vehicles is constructed from only two sizes of modular solid-propellant rocket motors, a large rocket motor and a small rocket motor. The modular rocket motors are clustered and stacked in various configurations to form the family of launch vehicles. The physical and performance characteristics of the two solid-propellant rocket motors, including weight, vacuum specific impulse and action time, were tailored to maximize the payload capabilities of each member of the launch vehicle family without exceeding predetermined maximum and staging dynamic pressure limits and maximum acceleration limits. The universal launch facility utilizes a steel canister that is sized to hold the maximum diameter and length launch vehicle. The steel canister is secured in a concrete-lined launch pit and the vehicle is expelled from the canister by a piston. The piston is caught by an arrestor device upon reaching the end of the canister. An assembly platform at the top of the piston provides a platform for assembling the launch vehicle.

39 Claims, 4 Drawing Sheets

MODULAR SOLID-PROPELLANT LAUNCH VEHICLE AND RELATED LAUNCH FACILITY

BACKGROUND OF THE INVENTION

This invention relates generally to launch systems for placing payloads in earth orbit and, more particularly, to solid-propellant launch vehicles that are canister launched.

A limited number of different types of launch vehicles is presently available for placing a wide range of payloads in earth orbit. Payloads span a wide range of weights and volumes and when a particular payload begins to exceed the weight and volume constraints of a given launch vehicle, either a costly and lengthy weight or volume reduction program must be initiated or a much larger and more costly launch vehicle must be used. Payload weight and volume reductions are not only costly, but also lead to more risky designs. For example, weight reductions require lighter weight structural components which are fragile and more elastic. Volume reductions require that antennas, solar panels and other large payload structures be constructed of multiple articulated segments for stowability, while other components must be miniaturized. Multiple articulated segments increase weight and complexity, reduce stiffness, and require additional testing.

Accordingly, there has been a need for a launch vehicle that will easily accommodate any size and weight payload and be less costly to develop, construct and operate than present day launch vehicles. The launch vehicle should be easily launched from a facility that is less costly to construct and operate than present day launch facilities, thus further reducing overall launch costs. Greatly reducing overall launch costs compared to the costs of present day launch systems would remove a major impediment to the full exploitation of space for many military, scientific and commercial endeavors. The present invention is directed to this end.

SUMMARY OF THE INVENTION

The present invention resides in a family of modular solid-propellant launch vehicles and a related launch facility for placing a wide range of payloads in earth orbit at greatly reduced costs compared to present day launch systems. The basic family of modular solid-propellant launch vehicles is constructed from only two sizes of modular solid-propellant rocket motors, a large rocket motor and a small rocket motor. The modular rocket motors are clustered and stacked in various configurations to form the family of launch vehicles. The physical and performance characteristics of the two solid-propellant rocket motors, including weight, vacuum specific impulse and action time, were tailored to maximize the payload capabilities of each member of the launch vehicle family without exceeding predetermined maximum and staging dynamic pressure limits and maximum acceleration limits.

These predetermined limits included an axial acceleration limit of 6.0 g's, a maximum dynamic pressure limit of 3500 psf and a dynamic pressure limit at stage separation of 600 psf. The maximum dynamic pressure limit determines the maximum structural loads imposed on the launch vehicle during flight and the staging dynamic pressure limit determines controllability at stage separation. Low earth orbit trajectory simulations were flown for all members of the launch vehicle family to tailor the physical and performance characteristics of the two rocket motors to maximize payload capabilities without exceeding the predetermined limits. A low earth orbit was selected since this represented the worst case maximum dynamic pressure. The results indicated that the large solid-propellant rocket motor should have a diameter of approximately 83 to 120 inches, a weight of approximately 110,000 to 125,000 pounds, a vacuum specific impulse of approximately 260 to 290 seconds, and an action time of approximately 58 to 90 seconds. The small rocket motor should have the same diameter as the large rocket motor, a weight of approximately 17,000 to 50,000 pounds, a vacuum specific impulse of approximately 270 to 305 seconds, and an action time of approximately 60 to 130 seconds. The diameters of the two modular rocket motors should be identical since structural weight and aerodynamic drag are both higher for configurations with motors having different diameters.

The basic family of launch vehicles varies from a two stage launch vehicle having a single small rocket motor stacked on top of a large rocket motor to a three stage launch vehicle having a cluster of five small rocket motors stacked on top of a cluster of five large rocket motors and a cluster of seven large rocket motors. This basic family of launch vehicles of the present invention provides low earth orbital insertion for a wide range of payloads, from approximately 2400 to 32,000 pounds, or geosynchronous orbital insertion for payloads from approximately 850 to 11,350 pounds. The low earth orbit is a 100 nmi orbit at an Inclination of 28.5° and the geosynchronous orbit is a 100 × 19,323 nmi orbit at an inclination of 28.5°.

Strapon rocket motors can be attached to each member of the basic family to increase payload weights. The strapon rocket motors can be either the large modular rocket motor of the present invention or other commercially available strapon rocket motors. Other members of the family of launch vehicles, in addition to the strapon versions, include five-cluster two and three stage versions and seven-cluster two and three stage versions.

Adjacent stages are connected together with an interstage. The interstage includes a single monocoque skirt with endplates to which the upper and lower rocket motors are attached. Stage separation is then effected by cutting the skirt with a single linear shaped charge. This arrangement facilitates assembly, is structurally very rugged, and greatly simplifies the stage separation mechanism. It also permits different numbers of motors to be used in the stages, if desired.

The modular solid-propellant rocket motors are used exclusively for all boost functions and a restartable upper stage, positioned on the top of the upper stage, is used for attitude control and orbital maneuvers and insertion. The restartable upper stage also carries the guidance, navigation and control system, airborne power supply, telemetry system, and command-destruct system.

The parallel clusters of modular rocket motors accommodate large diameter conformal fairings, up to approximately 23 feet, for clusters of seven rocket motors having a diameter of 92 inches. The large conformal fairings eliminate the need for hammerhead fairings, which are expensive to design and test and impose high structural loads on the launch vehicle and negatively impact its stability margins. The large payload volume provided by a large fairing is useful for large fixed structures, such as antennas and solar arrays, eliminating the need for articulated designs. Considerable time, money and testing is associated with the design and development of articulated structures. Also, the large diameter fairings provide sufficient clearance between the payload and the fairing envelope to permit "over the end" removal, rather than the more expensive clam shell separation method used by most present day fairings.

Each member of the launch vehicle family can be canister launched in conventional fashion. Stages of the modular rocket motors are assembled and the stages are inserted into segmented canisters. The segmented canisters are then connected together and attached to a payload while the vehicle is horizontal. The launch vehicle can also be assembled horizontally to form a complete vehicle and then inserted into a non-segmented canister. The canister, with the launch vehicle inside, is mated to an erection bridge and rotated to vertical by a pivot assembly. The vehicle is rotated into a concrete-lined launch pit and is launched by being expelled from the canister with a pressurized gas.

Canister launchers can be designed to accommodate all sizes of launch vehicles, except those with strapon rocket motors. The pressurized gas is preferably a cold gas, such as nitrogen or air, although hot gases or steam can also be used. A pressurized gas supply system supplies the pressurized gas to the canister. Liquid nitrogen or liquid air evaporators can be used to provide the pressurized gas very inexpensively, without requiring expensive compressors. Precise control of the pressure in the supply system can be set by placing a known weight of liquid nitrogen or air into the evaporator. Launch costs are reduced by eliminating the need to refurbish and reload a launch eject gas generator and the required decontamination of the canister after each launch, as required by present day launchers.

Each member of the launch vehicle family can also be launched by a universal launch facility in accordance with the present invention. This is preferred over the canister launcher since a single universal launch facility can launch any size vehicle, including non-axisymmetric vehicles, such as those with strapon rocket motors. The universal launch facility utilizes a steel canister that is sized to hold the maximum diameter and length launch vehicle. The steel canister is secured in a concrete-lined launch pit and the vehicle is expelled from the canister by a piston. The piston is caught by an arrestor device upon reaching the end of the canister. An assembly platform at the top of the piston provides a platform for assembling the launch vehicle.

The piston is preferably driven by a pressurized cold gas, such as nitrogen or air, although hot gases or steam can also be used. When the piston nears the top of the canister, it passes vent holes which rapidly bleed pressure from the canister. The piston then encounters the arrestor device, which uses heavy springs and hydraulic or crushable snubbers to stop the piston. When the acceleration of the vehicle and piston reaches zero, as measured by the guidance system, the assembly platform joining the vehicle to the piston is explosively severed from the vehicle.

The universal launch facility requires no pads on the launch vehicle, thus eliminating considerable cost and complexity compared with a conventional canister launcher. The piston and assembly platform also serve as an elevator for minimizing the amount of ground support equipment needed for assembly, servicing and launch. The piston and assembly platform are raised and lowered by varying the gas pressure or by means of a hydraulic system. Assembly of a vehicle is accomplished by raising the piston to the top of the canister, assembling the first stage module on the platform, then lowering the piston for assembly of successive stages. Mechanical brakes lock the piston in place during the assembly operation. All work is thus performed at ground level, eliminating the need for gantries.

The combination of the modular launch vehicle and ground level operations allows the vehicle to be assembled very quickly. This results in low capital investment and low operational costs. In addition, solid motors have no functioning parts that can be tested prior to launch, other than for electrical continuity, thus eliminating the expense of testing. Therefore, the low-cost launch facility of the present invention when combined with the low-cost launch vehicle of the present invention greatly reduces overall launch costs.

It will be appreciated from the foregoing that the present invention represents a significant advance in the field of launch systems. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

Figure 1:
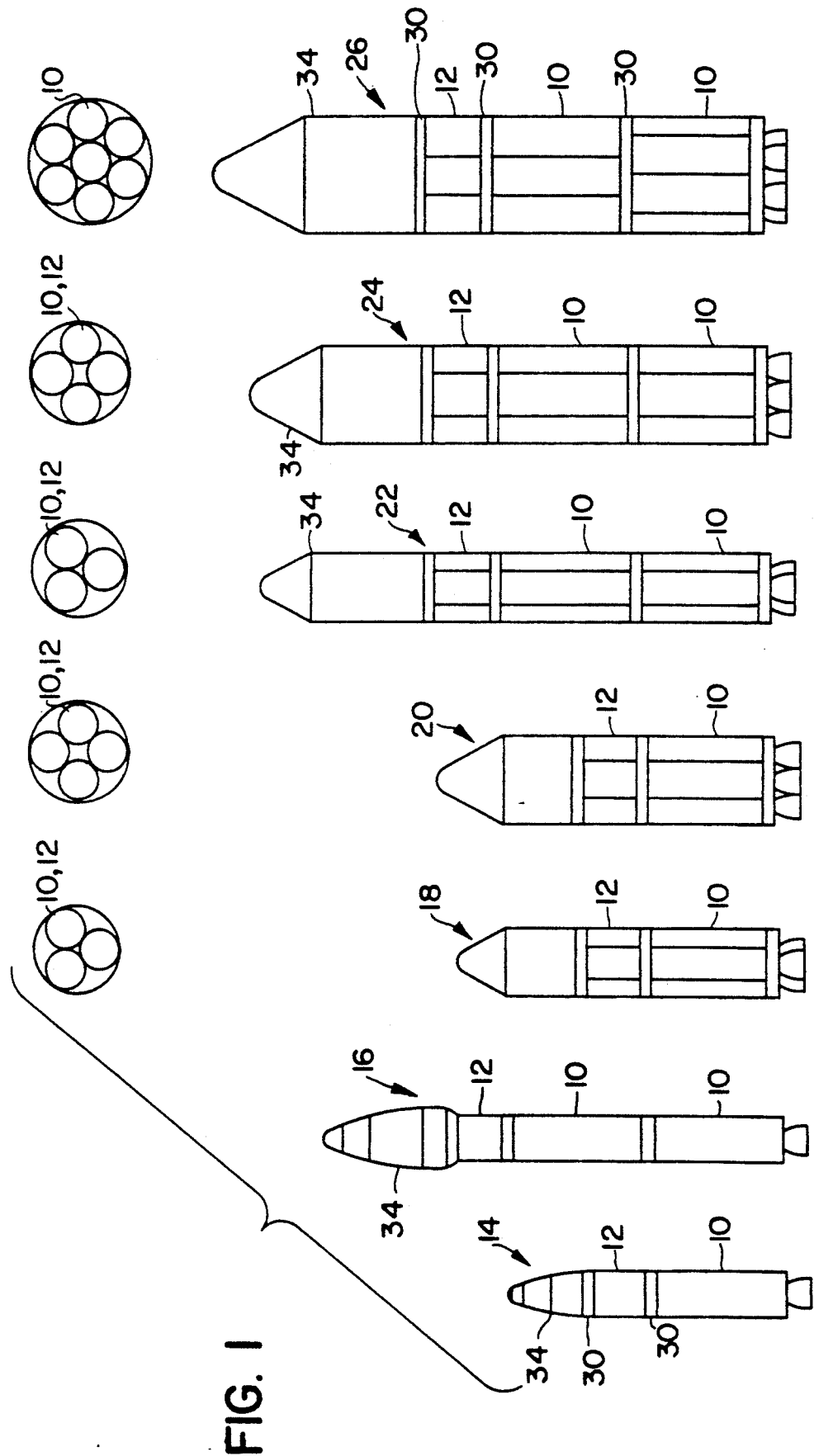
FIG. 1 is a schematic drawing of a basic family of modular solid-propellant launch vehicles in accordance with the present invention.
Figure 2:
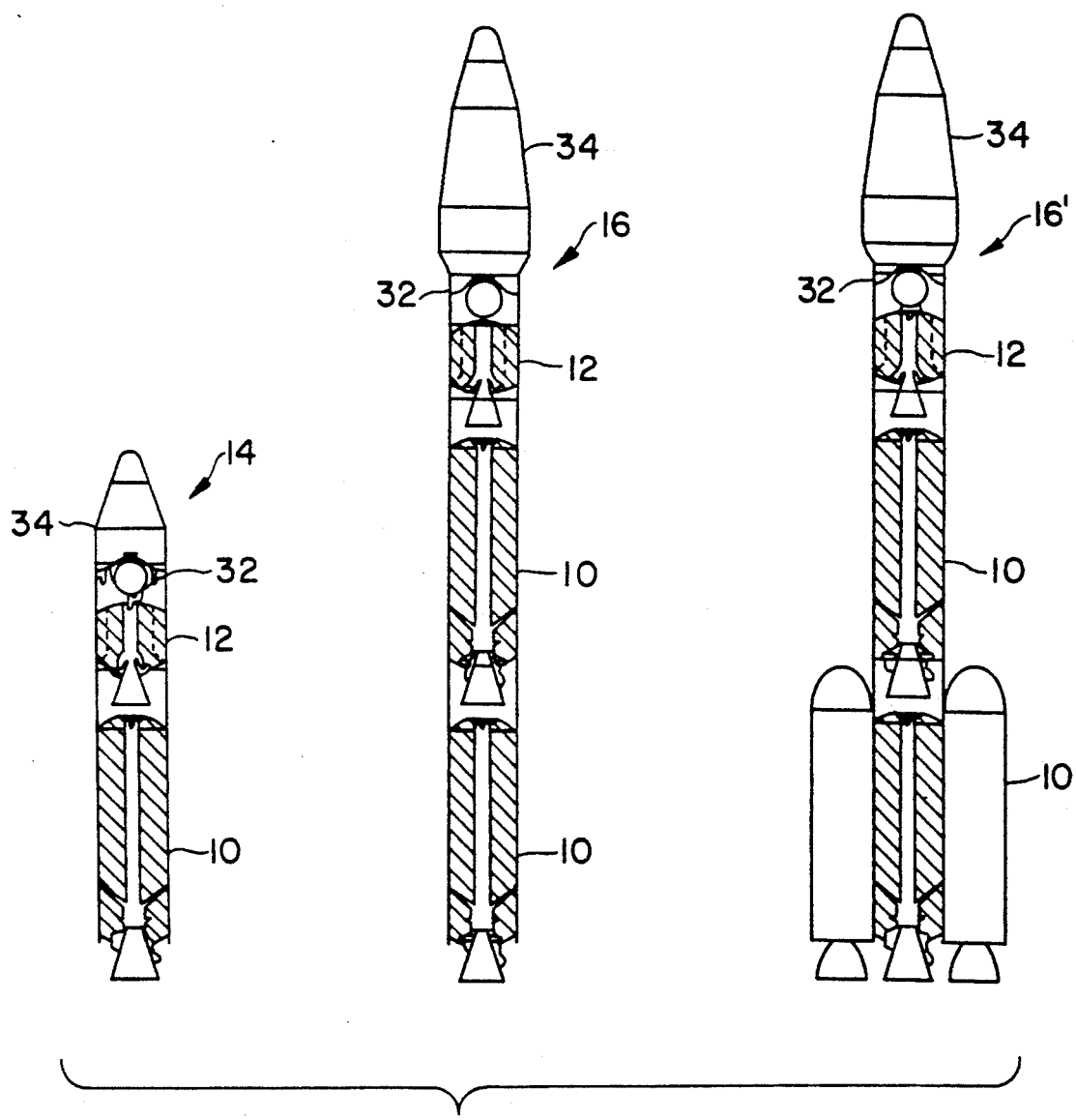
FIG. 2 is a cross sectional view of several members of the family of launch vehicles showing the modular solid-propellant rocket motors.

As shown in the drawings for purposes of illustration, the present invention is embodied in a family of modular solid-propellant launch vehicles and a related launch facility for placing a wide range of payloads in earth orbit at greatly reduced costs compared to present day launch systems. In accordance with the present invention, as illustrated in FIGS. 1 and 2, the basic family of modular solid-propellant launch vehicles is constructed from only two sizes of modular solid-propellant rocket motors, a large rocket motor 10 and a small rocket motor 12. The modular rocket motors are clustered and stacked in various configurations to form the family of launch vehicles. The physical and performance characteristics of the two solid-propellant rocket motors 10, 12, including weight, vacuum specific impulse and action time, were tailored to maximize the payload capabilities of each member of the launch vehicle family without exceeding predetermined maximum and staging dynamic pressure limits and maximum acceleration limits.

These predetermined limits included an axial acceleration limit of 6.0 g's, a maximum dynamic pressure limit of 3500 psf and a dynamic pressure limit at stage separation of 600 psf. The maximum dynamic pressure limit determines the maximum structural loads imposed on the launch vehicle during flight and the staging dynamic pressure limit determines controllability at stage separation. The action time of each modular rocket motor is defined as the burn time from ignition to the point in time at which the thrust of the large rocket motor decays to 50,000 pounds or the thrust of the small rocket motor decays to 10,000 pounds.

Low earth orbit trajectory simulations were flown for all members of the launch vehicle family to tailor the physical and performance characteristics of the two rocket motors 10, 12 to maximize payload capabilities without exceeding the predetermined limits. A low earth orbit was selected since this represented the worst case maximum dynamic pressure. The results indicated that the large solid-propellant rocket motor should have a diameter of approximately 83 to 120 inches, a weight of approximately 110,000 to 125,000 pounds, a vacuum specific impulse of approximately 260 to 290 seconds, and an action time of approximately 58 to 90 seconds. The small rocket motor should have the same diameter as the large rocket motor, a weight of approximately 17,000 to 50,000 pounds, a vacuum specific impulse of approximately 270 to 305 seconds, and an action time of approximately 60 to 130 seconds. Mass fraction for both rocket motors, defined as the propellant weight divided by the total booster weight, was to be higher than 0.9. The diameters of the two modular rocket motors should be identical since structural weight and aerodynamic drag are both higher for configurations with motors having different diameters.

The smallest member of the basic launch vehicle family shown in FIGS. 1 and 2 is a two stage launch vehicle 14 having a single small rocket motor 12 stacked on top of a large rocket motor 10. The next smallest member is a three stage launch vehicle 16 having a single small rocket motor 12 stacked on top of two large rocket motors 10. For greater payload capabilities and fairing diameters, parallel clusters of these rocket motors can be configured. The next two members of the launch vehicle family are two stage launch vehicles 18, 20, with a cluster of three or four small rocket motors 12 stacked on top of a cluster of three or four large rocket motors 10, respectively. The next two members of the launch vehicle family are three stage launch vehicles 22, 24, with a cluster of three or four small rocket motors 12 stacked on top of two clusters of three or four large rocket motors 10, respectively. The largest member of the basic launch vehicle family shown in FIG. 1 is a three stage launch vehicle 26 having a cluster of five small rocket motors 12 stacked on top of a cluster of five large rocket motors 10 and a cluster of seven large rocket motors 10. The cluster pattern has one rocket motor at the center and the remaining motors arranged in a circle about the center rocket motor.

The basic family of launch vehicles of the present invention shown in FIG. 1, provides low earth orbital insertion for a wide range of payloads, from approximately 2400 to 32,000 pounds, or geosynchronous orbital insertion for payloads form approximately 850 to 11,350 pounds. The low earth orbit is a 100 nmi orbit at an inclination of 28.5° and the geosynchronous orbit is a 100 × 19,323 nmi orbit at an inclination of 28.5°.

As shown in FIG. 2, strapon rocket motors can be attached to each member of the basic family to increase payload weights. The strapon rocket motors can be either the large modular rocket motor 1 of the present invention or other commercially available strapon rocket motors. The strapon rocket motors should weigh approximately 8,000 to 125,000 pounds. Other members of the family of launch vehicles, in addition to the strapon versions, include five-cluster two and three stage versions and seven-cluster two and three stage versions.

Adjacent stages are connected together with an interstage 30. The interstage 30 includes a single monocoque skirt with endplates to which the upper and lower rocket motors are attached. Stage separation is then effected by cutting the skirt with a single linear shaped charge. This arrangement facilitates assembly, is structurally very rugged, and greatly simplifies the stage separation mechanism. It also permits different numbers of motors to be used in the stages if desired.

The modular solid-propellant rocket motors 10, 12 are used exclusively for all boost functions and a restartable upper stage 32, positioned on the top of each upper stage as shown in FIG. 2, is used for attitude control and orbital maneuvers and insertion. The restartable upper stage 32 also carries the guidance, navigation and control system, airborne power supply, telemetry system, and command-destruct system. The restartable upper stage 32 has four hydrazine rocket motors positioned about the periphery of a spherical hydrazine propellant tank to provide axial thrust and pitch/yaw control. A small attitude engine is packaged with each of these rocket motors to provide pitch, yaw and roll control. The attitude engines can be vectored to provide negative axial acceleration. The hydrazine rocket motors can also use a cold gas. Each modular rocket motor 10, 12 preferably has a cold gas/ hydraulic thrust vector control system for controlling the launch vehicle during the boost phase of the flight.

The parallel clusters of modular rocket motors 10, 12 accommodate large diameter conformal fairings 34, up to approximately 23 feet, for clusters of seven rocket motors 10, 12 having a diameter of 92 inches. The large conformal fairings 34 eliminate the need for hammerhead fairings, which are expensive to design and test and impose high structural loads on the launch vehicle and negatively impact its stability margins. The large payload volume provided by a large fairing is useful for large fixed structures, such as antennas and solar arrays, eliminating the need for articulated designs. Considerable time, money and testing is associated with the design and development of articulated structures. Also, the large diameter fairings provide sufficient clearance between the payload and the fairing envelope to permit "over the end" removal, rather than the more expensive clam shell separation method used by most present day fairings.

Figure 3:
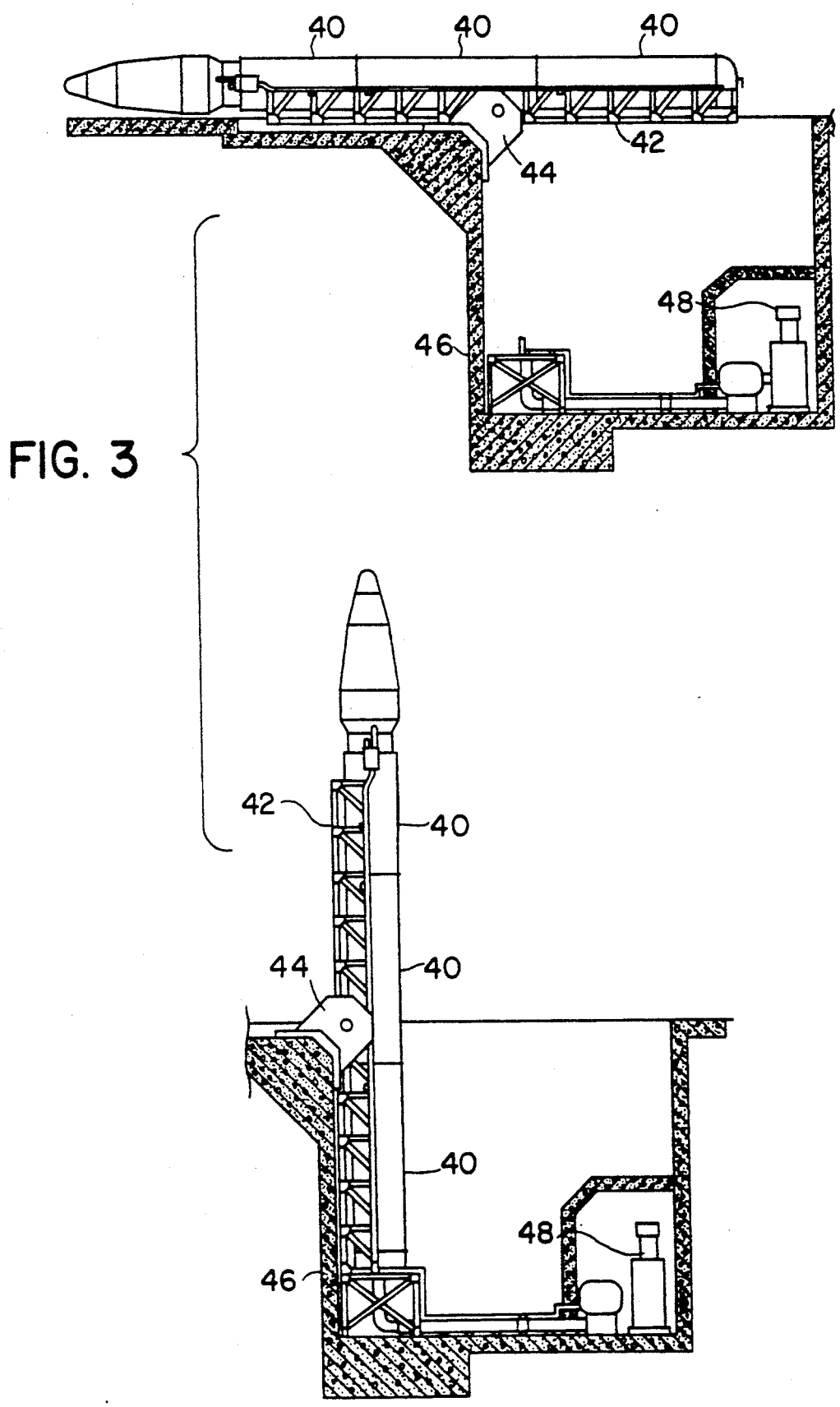
FIG. 3 is a schematic drawing of a canister launcher.

Each member of the launch vehicle family can be canister launched in conventional fashion, as shown in FIG. 3. Stages of the modular rocket motors 10, 12 are assembled and the stages are inserted into segmented canisters 40. The segmented canisters 40 are then connected together and attached to a payload while the vehicle is horizontal. The launch vehicle can also be assembled horizontally to form a complete vehicle and then inserted into a non-segmented canister. The canister 40, with the launch vehicle inside, is mated to an erection bridge 42 and rotated to vertical by a pivot assembly 44. The vehicle is rotated into a concrete-lined launch pit 46 and is launched by being expelled from the canister 40 with a pressurized gas. First stage rocket motor ignition occurs when the launch vehicle reaches a safe distance above the canister 40.

Canister launchers can be designed to accommodate all sizes of launch vehicles, except those with strapon rocket motors. The pressurized gas is preferably a cold gas, such as nitrogen or air, although hot gases or steam can also be used. A pressurized gas supply system 48 supplies the pressurized gas to the canister 40. Liquid nitrogen or liquid air evaporators can be used to provide the pressurized gas very inexpensively, without requiring expensive compressors. Precise control of the pressure in the supply system 48 can be set by placing a known weight of liquid nitrogen or air into the evaporator. Launch costs are reduced by eliminating the need to refurbish and reload a launch eject gas generator and the required decontamination of the canister after each launch, as required by present day launchers.

Figure 4:
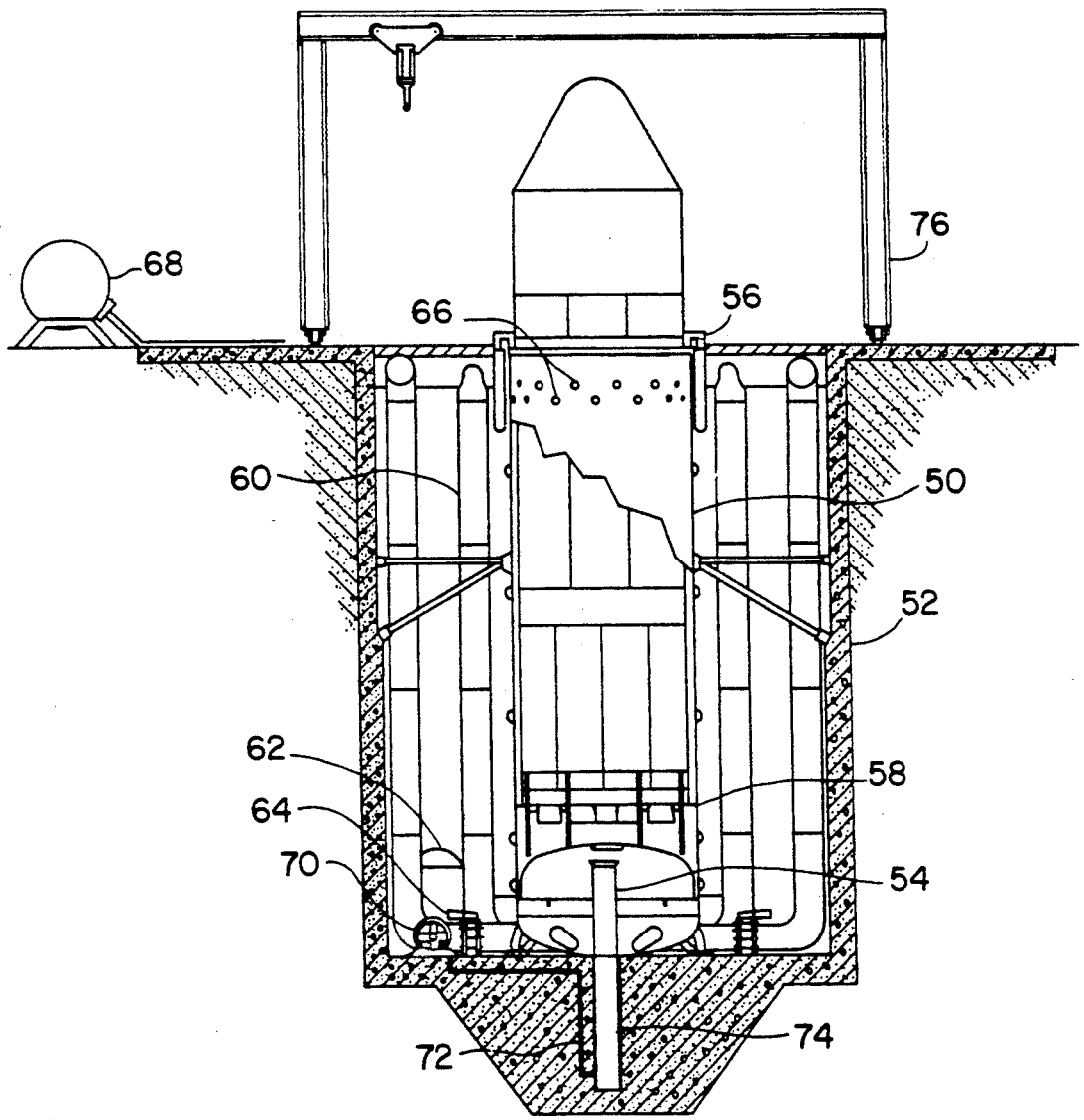
FIG. 4 is a cross sectional view of a universal launch facility in accordance with the present invention.

Each member of the launch vehicle family can also be launched by a universal launch facility in accordance with the present invention, as shown in FIG. 4. This is preferred over the canister launcher since a single universal launch facility can launch any size vehicle, including non-axisymmetric vehicles, such as those with strapon rocket motors. The universal launch facility utilizes a steel canister 50 that is sized to hold the maximum diameter and length launch vehicle. The steel canister 50 is secured in a concrete-lined launch pit 52 and the vehicle is expelled from the canister 50 by a piston 54. The piston 54 is caught by an arrestor device 56 upon reaching the end of the canister 50. An assembly platform 58 at the top of the piston 54 provides a platform for assembling the launch vehicle.

The piston 54 is preferably driven by a pressurized cold gas, such as nitrogen or air, although hot gases or steam can also be used. A pressurized gas supply system supplies the pressurized gas to the piston 54. The pressurized gas supply system includes a series of large diameter steel pipes 60 for storing the gas, a liquid storage tank 62 for supplying the gas, and a butterfly valve 64 at the bottom of each steel pipe 60 to release the gas for launch. The pressurized gas drives the piston 54 and the vehicle to a velocity of about 150 fps. When the piston 54 nears the top of the canister 50, it passes vent holes 66 which rapidly bleed pressure from the canister 50. The piston 54 then encounters the arrestor device 56, which uses heavy springs and hydraulic or crushable snubbers to stop the piston 54. When the acceleration of the vehicle and piston 54 reaches zero, as measured by the guidance system, the assembly platform 58 joining the vehicle to the piston 54 is explosively severed from the vehicle.

The universal launch facility requires no pads on the launch vehicle, thus eliminating considerable cost and complexity compared with a conventional canister launcher. The piston 54 and assembly platform 58 also serve as an elevator for minimizing the amount of ground support equipment needed for assembly, servicing and launch. The piston 54 and assembly platform 58 are raised and lowered by varying the gas pressure or by means of a hydraulic system. The hydraulic system includes a hydraulic reservoir 68, a hydraulic pump 70, a hydraulic line 72 and a hydraulic elevator 74. Assembly of a vehicle is accomplished by raising the piston 54 to the top of the canister 50, assembling the first stage module on the platform 58, then lowering the piston 54 for assembly of successive stages. Mechanical brakes lock the piston 54 in place during the assembly operation. All work is thus performed at ground level, eliminating the need for gantries. Only a single overhead crane 76 is required to lift the components from their transport vehicles and place them at work level.

The combination of the modular launch vehicle and ground level operations allows the vehicle to be assembled very quickly. This results in low capital investment and low operational costs. In addition, solid motors have no functioning parts that can be tested prior to launch, other than for electrical continuity, thus eliminating the expense of testing. Therefore, the low-cost launch facility of the present invention when combined with the low-cost launch vehicle of the present invention greatly reduces overall launch costs.

From the foregoing, it will be appreciated that the present invention represents a significant advance in the field of launch systems. Although several preferred embodiments of the invention have been shown and described, it will be apparent that other adaptations and modifications can be made without departing from the spirit and scope of the invention. Accordingly, the invention is not to be limited, except as by the following claims.

We claim:

1. A family of modular solid-propellant launch vehicles, each launch vehicle comprising:
   - a lower stage of one or more large modular solid-propellant rocket motors clustered together; and
   - an upper stage of one or more small modular solid-propellant rocket motors clustered together and mounted on the lower stage;
   - wherein weight, vacuum specific impulse and action time of both modular rocket motors are tailored to maximize payload capabilities of each member of the launch vehicle family without exceeding predetermined maximum and staging dynamic pressure limits and maximum acceleration limits;
   - and whereni the acceleration limit is 6.0 g's, the maximum dynamic pressure limit is 3500 psf and the dynamic pressure limit at stage separation is 600 psf.

2. The family of launch vehicles as set forth in claim 1, each launch vehicle further including:
   - an intermediate stage of one or more large modular solid-propellant rocket motors clustered together and mounted between the upper and lower stages.

3. A family of modular solid-propellant launch vehicles, each launch vehicle comprising:
   - a lower stage of one or more large modular solid-propellant rocket motors clustered together, each large rocket motor having a weight of approximately 110,000 to 125,000 pounds, a vacuum specific impulse of approximately 260 to 290 seconds and an action time of approximately 58 to 90 seconds; and
   - an upper stage of one or more small modular solid-propellant rocket motors clustered together and mounted on the lower stage, each small rocket motor having a weight of approximately 17,000 to 50,000 pounds, a vacuum specific impulse of approximately 270 to 305 seconds and an action time of approximately 60 to 130 seconds.

4. The family of launch vehicles as set forth in claim 3, each launch vehicle further including:
   - an intermediate stage of one or more large modular solid-propellant rocket motors clustered together and mounted between the upper and lower stages.

5. The family of launch vehicles as set forth in claim 4, wherein the diameters of both modular rocket motors are identical and approximately 83 to 120 inches.

6. The family of launch vehicles as set forth in claim 4, each launch vehicle further including:
   - an interstage for connecting the upper intermediate and lower stages, the interstage having a monocoque skirt with endplates to which the rocket motors are attached and a linear shaped charge for cutting the skirt at stage separation.

7. The family of launch vehicles as set forth in claim 4, wherein members of the launch vehicle family have clusters of three large and three small modular rocket motors.

8. The family of launch vehicles as set forth in claim 4, wherein members of the launch vehicle family have clusters of four large and four small modular rocket motors.

9. The family of launch vehicles as set forth in claim 4, wherein members of the launch vehicle family have clusters of five large and five small modular rocket motors.

10. The family of launch vehicles as set forth in claim 4, wherein members of the launch vehicle family have clusters of seven large and seven small modular rocket motors.

11. The family of launch vehicles as set forth in claim 4, each launch vehicle further including:
a plurality of solid-propellant strapons attached to the first stage of modular rocket motors.

12. The family of launch vehicles as set forth in claim 11, wherein each strapon is a large modular rocket motor.

13. The family of launch vehicles as set forth in claim 4, each launch vehicle further including:
a conformal fairing for protecting a payload mounted on the upper stage, the clustering of the modular rocket motors allowing the conformal fairing to accommodate a large fixed payload.

14. The family of launch vehicles as set forth in claim 1, wherein the diameters of both modular rocket motors are identical and approximately 83 to 120 inches.

15. The family of launch vehicles as set forth in claim 1, each launch vehicle further including:
an interstage for connecting the upper and lower stages, the interstage having a monocoque skirt with endplates to which the rocket motors are attached and a linear shaped charge for cutting the skirt at stage separation.

16. The family of launch vehicles as set forth in claim 3, wherein members of the launch vehicle family have clusters of three large and three small modular rocket motors.

17. The family of launch vehicles as set forth in claim 3, wherein members of the launch vehicle family have clusters of four large and four small modular rocket motors.

18. The family of launch vehicles as set forth in claim 3, wherein members of the launch vehicle family have clusters of five large and five small modular rocket motors.

19. The family of launch vehicles as set forth in claim 3, wherein members of the launch vehicle family have clusters of seven large and seven small modular rocket motors.

20. The family of launch vehicles as set forth in claim 3, each launch vehicle further including:
a plurality of solid-propellant strapons attached to the first stage of modular rocket motors.

21. The family of launch vehicles as set forth in claim 20, wherein each strapon is a large modular rocket motor.

22. The family of launch vehicles as set forth in claim 3, each launch vehicle further including:
a conformal fairing for protecting a payload mounted on the upper stage, the clustering of the modular rocket motors allowing the conformal fairing to accommodate a large fixed payload.

23. A universal launch facility for launching a vehicle, comprising:
a canister;
a piston slidably mounted in the canister; and
an assembly platform attached to top of the piston;
wherein the launch vehicle is assembled on the assembly platform and then launched by the piston, the piston and assembly platform serving as an elevator for minimizing the amount of ground support equipment needed for assembly, servicing and launch of the vehicle.

24. The universal launch facility as set forth in claim 23, and further including a pressurized gas supply system for supplying a pressurized gas to drive the piston.

25. The universal launch facility as set forth in claim 24, wherein the pressurized gas supply system includes:
a series of large diameter pipes for storing the gas;
a liquid storage tank for supplying the gas; and;
a butterfly valve at the bottom of each steel pipe to release the gas for launch.

26. The universal launch facility as set forth in claim 24, wherein the cold gas is nitrogen.

27. The universal launch facility as set forth in claim 24, wherein the cold gas is air.

28. The universal launch facility as set forth in claim 24, wherein the piston and assembly platform are raised and lowered by varying the gas pressure.

29. The universal launch facility as set forth in claim 23, wherein the canister is secured in a concrete-lined launch pit.

30. The universal launch facility as set forth in claim 23, and further including an arrestor device at the top of the canister for stopping the piston.

31. The universal launch facility as set forth in claim 23, wherein the assembly platform joining the vehicle to the piston is explosively severed from the vehicle when the acceleration of the vehicle and piston reaches zero, as measured by a guidance system in the vehicle.

32. The universal launch facility as set forth in claim 23, wherein the piston and assembly platform are raised and lowered by means of a hydraulic system.

33. A method for assembling and launching a vehicle, comprising the steps of:
assemblying the vehicle on an assembly platform attached to the top of a piston; and
launching the vehicle with the piston, wherein the piston and assembly platform serves as an elevator for minimizing the amount of ground support equipment needed for assembly, servicing and launch of the vehicle.

34. The method for assembling and launching a vehicle as set forth in claim 33, wherein the piston is driven by a pressurized gas.

35. The method for assembling and launching a vehicle as set forth in claim 34, wherein the pressurized gas is nitrogen.

36. The method for assembling and launching a vehicle as set forth in claim 34, wherein the pressurized gas is air.

37. The method for assembling and launching a vehicle as set forth in claim 34, wherein the piston and assembly platform are raised and lowered by varying the gas pressure.

38. The method for assembling and launching a vehicle as set forth in claim 33, wherein the assembly platform joining the vehicle to the piston is explosively severed from the vehicle when the acceleration of the vehicle and piston reaches zero, as measured by a guidance system in the vehicle.

39. The method for assembling and launching a vehicle as set forth in claim 33, wherein the piston and assembly platform are raised and lowered by means of a hydraulic system.

* * * * *